(12) United States Patent
Tamura et al.

(10) Patent No.: US 10,509,701 B2
(45) Date of Patent: Dec. 17, 2019

(54) PERFORMING DATA BACKUPS USING SNAPSHOTS

(71) Applicant: Apple Inc., Cupertino, CA (US)

(72) Inventors: Eric B. Tamura, Sunnyvale, CA (US); Dominic B. Giampaolo, Lewiston, ME (US)

(73) Assignee: Apple Inc., Cupertino, CA (US)

( * ) Notice: Subject to any disclaimer, the term of this patent is extended or adjusted under 35 U.S.C. 154(b) by 561 days.

(21) Appl. No.: 15/275,144

(22) Filed: Sep. 23, 2016

(65) Prior Publication Data

US 2018/0089033 A1   Mar. 29, 2018

(51) Int. Cl.
*G06F 11/14* (2006.01)
*G06F 16/16* (2019.01)
*G06F 16/178* (2019.01)

(52) U.S. Cl.
CPC ...... *G06F 11/1451* (2013.01); *G06F 11/1464* (2013.01); *G06F 16/162* (2019.01); *G06F 16/178* (2019.01); *G06F 2201/80* (2013.01); *G06F 2201/84* (2013.01)

(58) Field of Classification Search
None
See application file for complete search history.

(56) References Cited

U.S. PATENT DOCUMENTS

| | | |
|---|---|---|
| 7,743,028 B1 | 6/2010 | Stringham et al. |
| 8,055,613 B1 * | 11/2011 | Mu ............... G06F 16/1734 707/610 |
| 8,429,359 B1 | 4/2013 | Desai et al. |
| 8,965,850 B2 | 2/2015 | Varadarajan |
| 9,116,846 B2 | 8/2015 | Vasilyev et al. |
| 9,881,040 B2 * | 1/2018 | Rawat ............. G06F 16/2246 |
| 2010/0077165 A1 * | 3/2010 | Lu ................. G06F 11/1451 711/162 |
| 2014/0325170 A1 * | 10/2014 | Aswathanarayana ......... G06F 9/45558 711/162 |
| 2015/0178167 A1 | 6/2015 | Kulkarni et al. |
| 2018/0129567 A1 * | 5/2018 | Kumarasamy ...... G06F 11/1435 |

* cited by examiner

*Primary Examiner* — Richard L Bowen
(74) *Attorney, Agent, or Firm* — Dickinson Wright RLLP

(57) ABSTRACT

The embodiments set forth a technique for carrying out a backup of data managed at a computing device. According to some embodiments, the technique can include the steps of (1) receiving a request to carry out the backup of the data, (2) in response to the request, generating a current snapshot of the data, (3) identifying, in accordance with the current snapshot of the data, block data of at least one data block to be reflected in the backup of the data, wherein the at least one data block is tagged with an identifier of a file node to which the at least one data block corresponds, and (4) providing information to a storage to cause the block data to be reflected in the backup of the data.

20 Claims, 7 Drawing Sheets

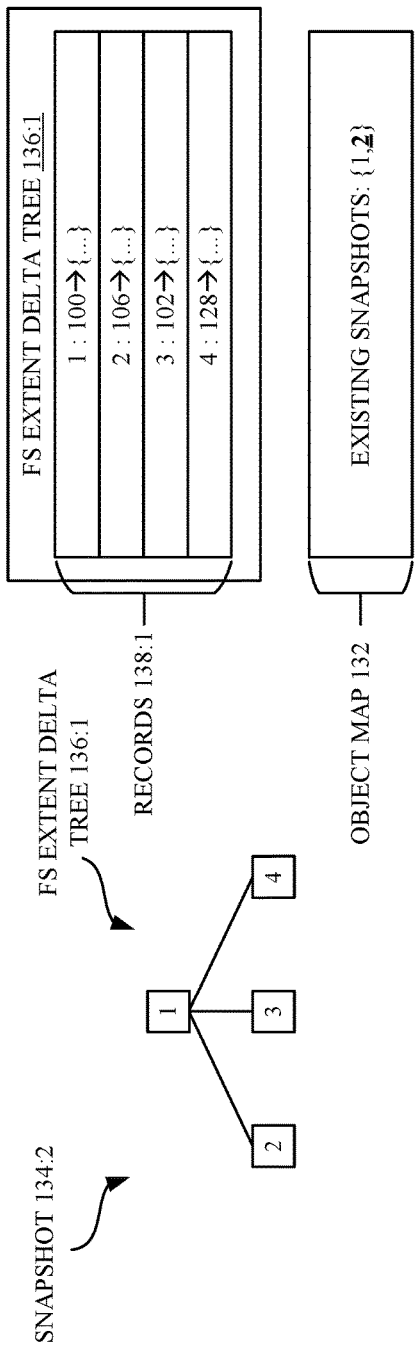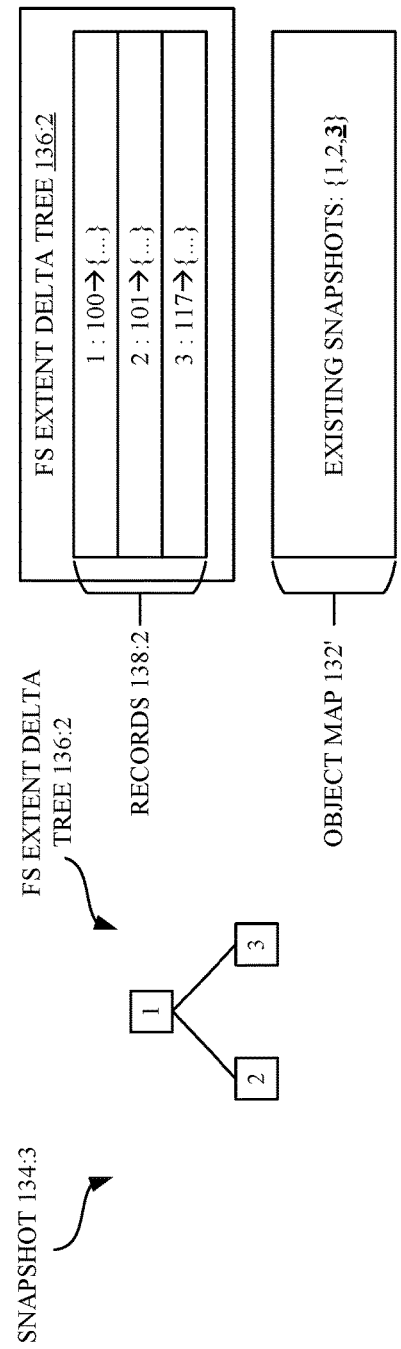
FIG. 3A
FIG. 3B

PERFORMING DATA BACKUPS USING SNAPSHOTS

FIELD

The described embodiments set forth techniques for backing up data of a file system volume to a storage system, e.g., a local storage system or a cloud storage system, through the utilization of snapshots.

BACKGROUND

When carrying out conventional data backup approaches it is difficult to efficiently identify fine-granularity changes—e.g., data block-level changes—that have occurred to files/directories (also referred to herein as "file nodes") between a current state of the file system volume and a previous state of a file system volume (i.e., when the file system volume was last backed up). Consequently, conventional approaches often involve (1) identifying file nodes that have changed in any manner since the last backup, and (2) providing complete copies of the file nodes to the server. In many cases, executing a backup based on file-level changes can be extremely wasteful of resources considering that relatively small changes can be made to large file nodes. For example, an introduction of subtitles to a high-definition video will increase its size by a relatively small amount, yet the entire high-definition video will be captured and provided in the backup simply due to the fact that a file-level change has occurred.

Notably, the increasing trend in hardware complexity and overall richness of file content is leading only to larger average file sizes, and therefore is exacerbating the overall inefficiency of backups that are performed at a file-level granularity. In particular, higher levels of energy and bandwidth are required both at the computing device and the destination storage system to process backups that are performed at a file-level granularity, and, as mentioned above, this will only worsen as the average size of files increases over time. Accordingly, there exists a need for a more efficient technique for periodically backing up data of a computing device.

SUMMARY

The embodiments described herein set forth techniques for identifying specific changes made to file nodes of a file system volume when preparing to back up data to a storage system.

One embodiment sets forth a technique for carrying out a backup of data managed at a computing device. According to some embodiments, the technique can include the steps of (1) receiving a request to carry out the backup of the data, (2) in response to the request, generating a current snapshot of the data, (3) identifying, in accordance with the current snapshot of the data, block data of at least one data block to be reflected in the backup of the data, wherein the at least one data block is tagged with an identifier of a file node to which the at least one data block corresponds, and (4) providing information to a storage to cause the block data to be reflected in the backup of the data.

Other embodiments include a non-transitory computer readable medium configured to store instructions that, when executed by a processor, cause the processor to implement any of the techniques set forth herein. Further embodiments include a computing device that is configured to implement the various techniques set forth herein.

This Summary is provided merely for purposes of summarizing some example embodiments to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments

BRIEF DESCRIPTION OF THE DRAWINGS

The included drawings are for illustrative purposes and serve only to provide examples of possible structures and arrangements for the disclosed inventive apparatuses and methods for their application to computing devices. These drawings in no way limit any changes in form and detail that can be made to the embodiments by one skilled in the art without departing from the spirit and scope of the embodiments. The embodiments will be readily understood by the following detailed description in conjunction with the accompanying drawings, wherein like reference numerals designate like structural elements.

FIGS. 3A-3B illustrate a conceptual diagram of an example scenario that involves identifying data blocks of file nodes that change between backups, according to some embodiments.

DETAILED DESCRIPTION

Figure 1:
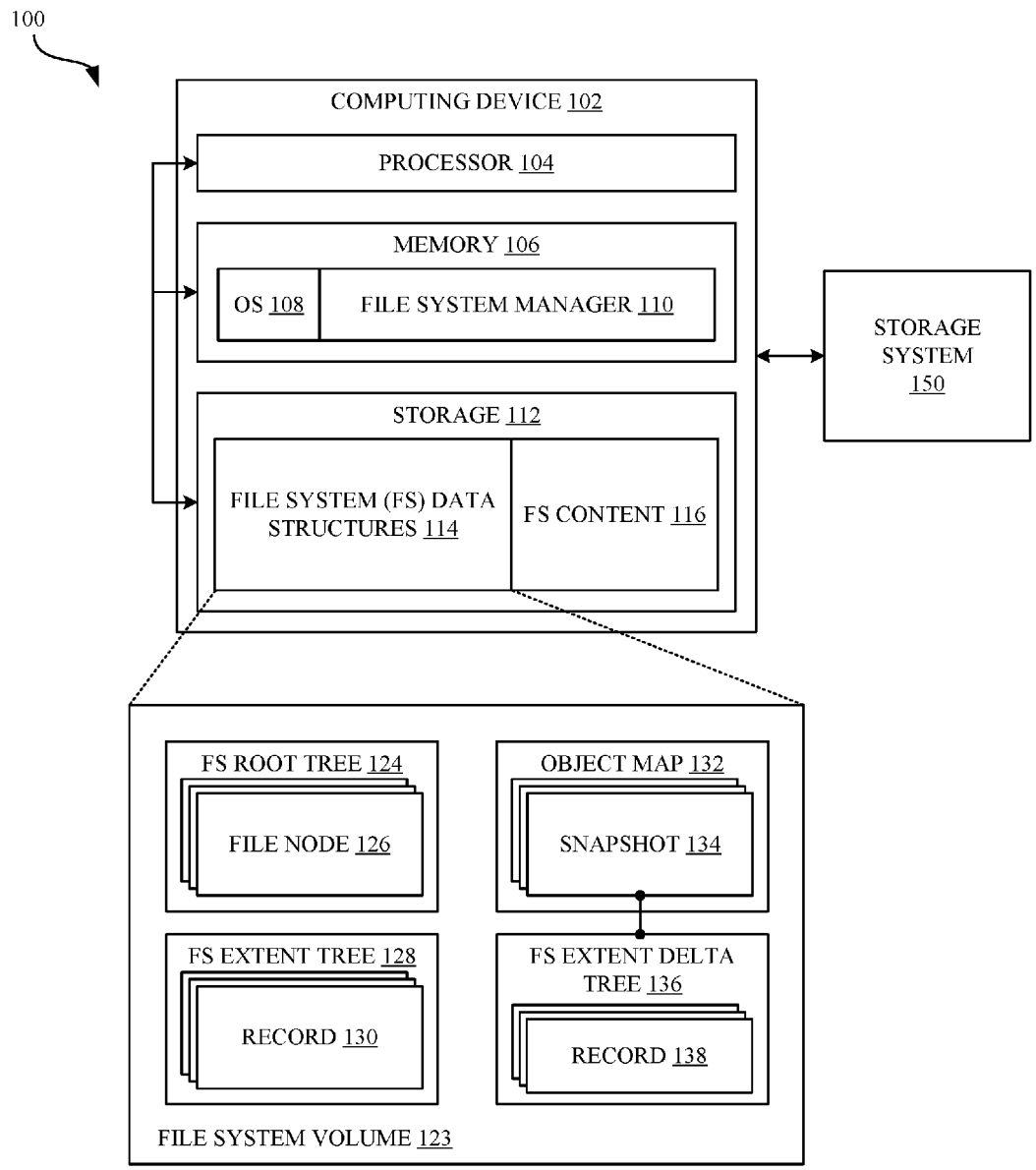
FIG. 1 illustrates a block diagram of different components of a computing device configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for taking snapshots of a file system volume (of a computing device) in conjunction with executing backups of the file system volume (to a storage system). According to some embodiments, a snapshot can represent a read-only copy of a file system volume at a specific point in time. When an initial snapshot of a file system volume is established, subsequent snapshots can reference only the changed data, and use pointers to reference the initial snapshot. This approach provides the benefit of utilizing snapshots that consume less storage capacity in comparison to typical, direct backups of file system volumes.

To implement the embodiments described herein, a file system manager of the computing device can be configured to manage different data structures for implementing file system volumes. According to some embodiments, the data structures can include, for each file system volume, (1) a file system root tree, (2) a file system extent tree, and (3) file system extent delta trees. According to some embodiments, the (1) file system root tree can contain file nodes that can be used to describe the file system volume, e.g., files, directories, data streams, encryption metadata, and the like. According to some embodiments, the (2) file system extent tree can contain records that can be used to track reference counts for file extents of file nodes belonging to the file system root tree, thereby enabling functionality such as cloning and space management to be effectively implemented. Additionally, and according to some embodiments, the (3) file system extent delta trees can contain records that can be used to track changes made to file extents of file nodes between snapshots/backups, which is described below in greater detail.

According to some embodiments, when a first (i.e., an initial) backup of the file system volume is to be carried out, the file system manager begins by creating a first snapshot of the file system volume. Because this is an initial backup, no existing/prior snapshots are associated with the file system volume, and it is not necessary for the file system manager to rely on analyzing the first snapshot when gathering data for the backup. Instead, the file system manager can simply gather the data of the file system volume when performing the first backup, and provides the data to the storage system. As a brief aside, it is noted that subsets of the file system volume—e.g., targeted files/directories, forbidden files/directories, etc.—can be identified when performing the backup, and that backing up all of the data of the file system volume is not required. In turn, the storage system receives and stores the data according to techniques described below in greater detail.

As noted above, the initial backup causes the file system manager to create the first snapshot. According to some embodiments, the file system manager can also be configured to create a first file system extent delta tree in conjunction with the creation of the first snapshot, where the first file system extent delta tree is specific to the first snapshot and corresponds to the first snapshot. According to some embodiments, the file system manager can update a configuration such that all changes made to the file system volume subsequent to the creation of first snapshot are captured in the first file system extent delta tree. In this manner, when a subsequent backup of the file system is to be carried out, the file system manager can (1) generate a second snapshot/a second file system extent delta tree, (2) identify the first snapshot associated with the initial backup, (3) identify the first file system extent delta tree associated with the first snapshot, and (4) analyze the information stored in the first file system extent delta tree to identify specific changes made to the file system volume that should be reflected when carrying out the subsequent backup. In turn, information about the specific changes can be provided to the storage system to enable the backup to execute in an accurate and efficient manner. Additionally, and in accordance with the foregoing description, the file system manager can utilize the second snapshot/second file system extent delta tree to effectively carry out a next backup, whereupon the same steps (1)-(4) can be repeated for each additional backup.

According to some embodiments, the file system volume can be configured to delete prior snapshots when new snapshots are generated in order to avoid unnecessary consumption of available storage space at the computing device. In particular, snapshots can be prone to requiring data to remain intact in the storage of the computing device even when the data is deleted from a live view of the file system volume. In some cases, when only a most recent backup is maintained at the storage system, it can be unnecessary to be retain such data at the computing device, and deleting the prior snapshot can help preserve available storage space.

According to some embodiments, each record included in a file system extent delta tree can be configured to include (1) an identifier that references a particular file node included in the file system root tree, and (2) information about data blocks that correspond to the particular file node that have changed since the creation of the snapshot associated with the file system extent delta tree. In this manner, when a subsequent snapshot is generated, the file system manager can reference the file system extent delta tree associated with the previous snapshot/backup to identify (1) the different file nodes that have changed since the previous snapshot/backup, and (2) the specific block data of the data blocks associated with the different file nodes that have changed. Importantly, maintaining the identifier within each record in the file system extent delta tree enables the file system manager to immediately identify a specific file node that has changed (e.g., created, modified, or deleted), which can increase the efficiency of the backup process. For example, when a relatively small number of data blocks associated with a file node change between a first backup and a second backup, the file system manager can reference the file system extent delta tree to identify the identifier that references the file node, as well as the changed data blocks of the file node. In turn, when carrying out the second backup, the file system manager can provide, to the storage system, (1) the identifier of the file node, and (2) the block data of the changed data blocks. Subsequently, the storage system can utilize the identifier of the file node to identify a corresponding file within a storage managed by the storage system, and update the corresponding file to reflect the block data of the changed data blocks.

Additionally, the management entity of the file system can be configured to implement an object map for managing the snapshots of the file system volume. According to some embodiments, the object map is an auxiliary data structure to the file system root tree, the file system extent tree, and the file system extent delta tree data structures, and the object map includes a collection of mapping entries. According to some embodiments, the mapping entries can be used to virtualize the manner in which the different file nodes of the file system root tree are referenced. For example, each mapping entry can include a key/value pair that associates the mapping entry with (1) a node within the file system root tree, (2) a transaction identifier ID (based on a current transaction ID), and (3) a physical address associated with the file node. Each mapping entry can also be configured to include flags for storing additional information, e.g., information that indicates when the mapping entry represents a deletion of a file node within the file system root tree.

According to some embodiments, the file system manager can be configured to manage the snapshots within the object map by recording snapshot IDs, where each snapshot ID represents a different existing snapshot of the file system volume. According to some embodiments, each snapshot ID can be based on the current transaction ID at the time the snapshot is created. In particular, a new snapshot can be generated simply by establishing a new snapshot ID for the file system volume based on the current transaction ID, whereupon the current transaction ID is closed, and a new current transaction ID is generated. Importantly, this approach obviates the need to maintain reference counts for determining whether a version of a file node in the file system root tree must be preserved as snapshots are generated over time. In particular, the transaction IDs/snapshot IDs can be used to determine whether a file node is (1) captured in a previous snapshot of the file system volume, (2) captured in a live view of the file system volume, or (3) is not captured in a previous snapshot/the live view of the file system (and can therefore be deleted).

Accordingly, executing backups in conjunction with snapshots can provide a variety of benefits that improve the overall efficiency of the backups. For example, a snapshot of the file system volume can be used to establish a preserved, read-only version of the file system volume, which, in turn, can be provided to the storage system even as updates are made to the file system volume while being backed up to the storage system. Moreover, the snapshot of the file system volume can be used to identify block level-granularity changes to specific file nodes of the file system volume that occur between backups, thereby conserving computing, energy, and bandwidth resources both at the computing device and the storage system when carrying out the backups.

A more detailed discussion of these techniques is set forth below and described in conjunction with FIGS. 1-7, which illustrate detailed diagrams of systems and methods that can be used to implement these techniques.

FIG. 1 illustrates a block diagram 100 of different components of a computing device 102 configured to implement the various techniques described herein, according to some embodiments. More specifically, FIG. 1 illustrates a high-level overview of the computing device 102, which, as shown, can include a processor 104, a memory 106, and a storage 112. According to some embodiments, the processor 104 can be configured to work in conjunction with the memory 106 and the storage 112 to enable the computing device 102 to operate in accordance with this disclosure. For example, the processor 104 can be configured to load an operating system (OS) 108 from the storage 112 into the memory 106 for execution, where the OS 108 includes a file system manager 110 configured to implement various techniques described herein. Although not illustrated in FIG. 1, it is understood that the OS 108 can be configured to enable a variety of processes to execute on the computing device 102, e.g., OS daemons, native OS applications, user applications, and the like.

According to some embodiments, and as described in greater detail herein, the file system manager 110 can represent logic/information for implementing the techniques described herein. For example, the file system manager 110 can be configured to implement a number of file system volumes 123 that each represent a separate and distinct file system within the computing device 102. According to some embodiments, the one or more file system volumes 123 can be members of a same container and can be configured to utilize the same physical storage space within the storage 112. This beneficially provides enhanced flexibility as each file system volume 123 can consume space within the storage 112 on an as-needed basis. In addition, each file system volume 123 can be configured to enforce particular configurations (e.g., permissions, ownership, encryption schemes, etc.) independent from the configurations of other file system volumes 123 managed by the file system manager 110.

According to some embodiments, and as described in greater detail herein, the file system manager 110 can be configured to implement a "write-elsewhere" approach. More specifically, when the file system manager 110 receives a request to modify a file, the file system manager 110 can write the changes into a new location within the storage 112 in conjunction with modifying the data. In this manner, the file system manager 110 can be capable of performing crash recovery techniques, e.g., the file system manager 110 can more reliably revert to a more stable version of a file system volume 123.

According to some embodiments, the storage 112 can represent a storage that is accessible to the computing device 102, e.g., a hard disk drive, a solid state drive, a mass storage device, a remote storage device, and the like. In some examples, the storage 112 can represent a storage that is accessible to the computing device 102 via a local area network (LAN), a personal area network (PAN), and the like. As shown in FIG. 1, the storage 112 can include file system data structures 114 for each file system volume 123, where the file system data structures 114 are utilized by the file system manager 110 to manage the file system content 116 (i.e., actual data of file nodes) of the file system volumes 123.

As previously described herein, the file system manager 110 can be configured to service requests for performing backups of the file system volumes 123. In particular, the file system manager 110 can be configured to gather the data within a file system volume 123 and provide the data to a storage system 150 to be stored as a backup. According to some embodiments, the storage system 150 can be accessible to the computing device 102 via a wide area network (WAN) (e.g., the Internet), where the storage system 150 represents a server that provides cloud-based storage. Alternatively, the storage system 150 can represent an internal storage device to the computing device 102 (e.g., an auxiliary storage), and/or a local storage device (e.g., a Network Attached Storage (NAS), a local storage, and the like) accessible to the computing device 102.

Referring back now to the file system data structures 114, these can include (1) a file system root tree 124, (2) a file system extent tree 128, and (3) file system extent delta trees 136, and can be used by the file system manager 110 to implement a file system volume 123. According to some embodiments, the file system root tree 124 can include file nodes 126 that describe various aspects of the file system volume 123, e.g., files, directories, data streams, encryption metadata, and the like. Moreover, the file system extent tree 128 can include file system extent records 130 that can be used to track reference counts for file extents of file nodes 126 that belong to the file system root tree 124. According to some embodiments, a file system extent tree record 130 can include a starting logical file offset, a length (in bytes), a physical data block address, and an encryption identifier, among other information. Notably, the file system extent tree 128 can enable the file system manager 110 to track multiple file nodes 126, e.g., multiple file nodes 126 that reference the same data block address(es), thereby enabling cloning techniques to be implemented. Accordingly, the association between the file nodes 126 and the corresponding data block addresses can be stored within the file system extent records 130. Although it is understood that storing the records in a tree representation that includes one or more file nodes 126 enables various operations, e.g., searches, sequential accesses, insertions, deletions, etc., to be carried out in an efficient manner, the embodiments set forth herein are not limited to tree-based data structures, and it is noted that any data structure can be used to organize the file nodes 126.

Additionally, and according to some embodiments, the file system data structures 114 can also include an object map 132 that is an auxiliary data structure to the file system root tree 124, the file system extent tree 128, and the file system extent delta trees 136. According to some embodiments, the object map 132 can be used to virtualize the manner in which the different file nodes 126 of the file system root tree 124 can be referenced. According to some embodiments, the object map 132 also can be configured to manage different snapshots 134 of the file system volume 123 that are created over time, e.g., in conjunction with each backup of the file system volume 123. In particular, information associated with each snapshot 134 can be managed within the object map 132 in a manner that enables the file system manager 110 to effectively reference previous snapshots 134—and their corresponding FS extent delta trees 136—when performing backups of the file system volume 123.

As previously described herein, the file system manager 110 can be configured to create a new file system extent delta tree 136 each time a new snapshot 134 is created, where the new file system extent delta tree 136 and the new snapshot 134 correspond to one another. According to some embodiments, each file system extent delta tree 136 can contain records 138 that track changes made to file extents of the file nodes 126 after the corresponding snapshot 134 is created. For example, when block data corresponding to a file node 126 is modified, the file system extent delta tree 136 can be updated to include a record 138 that indicates (1) a node identifier associated with the file node 126, and (2) information about the modified block data.

According to some embodiments, when a request for a first (i.e., an initial) backup of the file system volume 123 is received, the file system manager 110 responds by creating a first snapshot 134 of the file system volume 123. Because this is an initial backup, no existing/prior snapshots 134 are associated with the file system volume 123, and it is not necessary for the file system manager 110 to rely on analyzing the first snapshot 134 when gathering data for the backup. Instead, the file system manager 110 gathers the data—e.g., all of the data, or a subset of the data, depending on a configuration—of the file system volume 123, and provides the data to the storage system 150 for backup storage. In turn, the storage system 150 receives and stores the data. In conjunction with establishing the first snapshot 134 of the file system volume 123, the file system manager 110 can also establish a file system extent delta tree 136 that corresponds to the first snapshot 134. In this manner, any changes that are made to file nodes 126 of the file system volume 123 subsequent to creating the first snapshot 134 can be captured in the file system extent delta tree 136 in the form of records 138.

At a later time, the file system manager 110 can receive a subsequent request to generate a second backup of the file system volume 123. In response, and in accordance with the above-described techniques, the file system manager 110 can (1) generate a second snapshot 134 and a second file system extent delta tree 136, (2) identify the first snapshot 134 associated with the initial backup, (3) identify the first file system extent delta tree 136 associated with the first snapshot 134, and (4) analyze the records 138 stored in the first file system extent delta tree 136 to identify specific changes made to the file system volume 123 that should be reflected when carrying out the second backup. In turn, the file system volume 123 can be configured to produce a backup package that is sent to the storage system 150 to perform the backup, the details of which are described below in greater detail.

Figure 2:
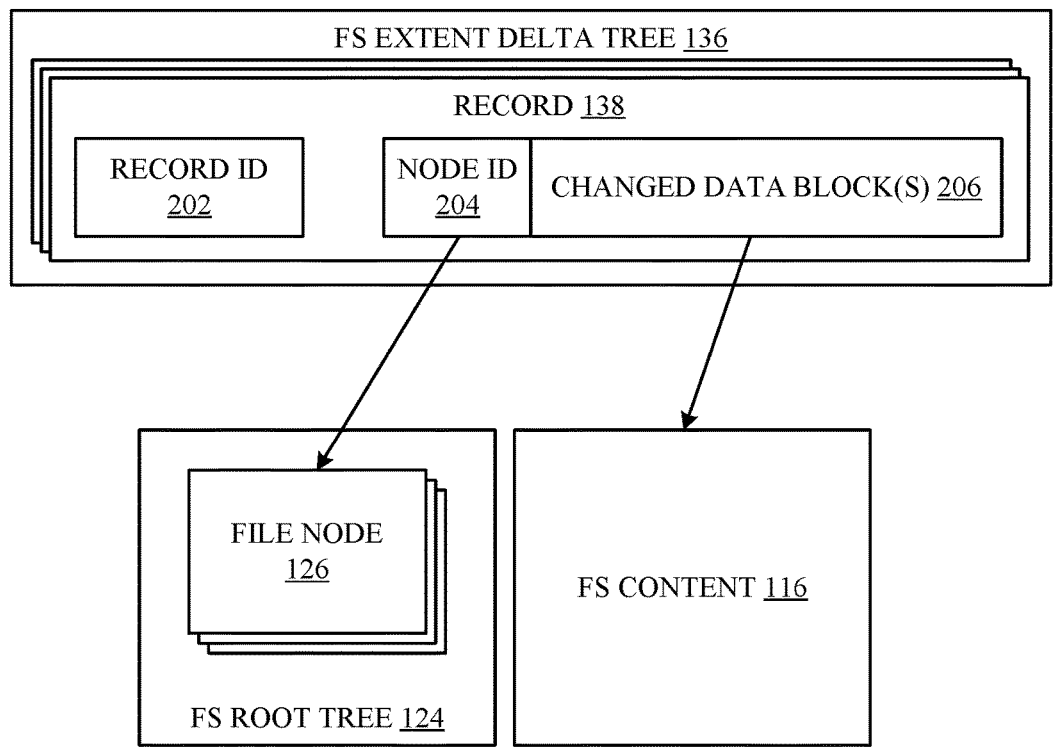
FIG. 2 illustrates a format for a record of an extent delta tree associated with a snapshot, according to some embodiments.

FIG. 2 illustrates an example format for a record 138 of a file system extent delta tree 136 associated with a snapshot 134, according to some embodiments. As shown in FIG. 2, each record 138 can include a key/value pair that associates the record 138 of the file system extent delta tree 136 with (1) a record ID 202 (that uniquely identifies each record 138 within the file system extent delta tree 136), (2) a file node ID 204 (that corresponds to a file node 126 in the file system root tree 124), and (3) changed data blocks 206 (that refers to modified data blocks associated with the file node 126). According to some embodiments, the file system manager 110 can be configured to establish a unique record 138 within the file system extent delta tree 136 whenever changes are made to a file node 126.

FIGS. 3A-3B illustrate a conceptual diagram of an example scenario that involves performing backups of a file system volume 123 at different times, according to some embodiments. Specifically, FIG. 3A illustrates an example scenario in which an initial backup has already been performed, and a subsequent (i.e., second) backup is requested. As shown in FIG. 3A, the object map 132 enables the file system manager 110 to determine that an initial snapshot 134:1 (not illustrated in FIG. 3A) having an ID of "1" was previously created in conjunction with performing the initial backup. Additionally, the file system manager 110 determines that a first file system extent delta tree 136:1 is linked to the initial snapshot 134:1, where the first file system extent delta tree 136:1 includes records 138 that track any changes made to the file nodes 126 of the file system volume 123 after the initial backup is requested/performed.

To initialize the process for executing the second backup, the file system manager 110 generates a second snapshot 134:2 having an ID of "2", and adds the second snapshot 134:2 to the object map 132, as illustrated in FIG. 3A. Additionally, and in accordance with the techniques described herein, the file system manager 110 creates a second file system extent delta tree 136:2 in conjunction with the second snapshot 134:2, where the second file system extent delta tree 136:2 is used to track any changes made to the file nodes 126 of file system volume 123 after the second backup is requested/performed. A more detailed description of the second file system extent delta tree 136:2 is provided below in conjunction with FIG. 3B.

As shown in FIG. 3A, the first file system extent delta tree 136:1—which, again, was established by the file system manager 110 at the time the initial backup was requested/performed, and is linked to the initial snapshot 134:1—includes a history of changes that have been made to the file nodes 126 between the time of the initial backup was requested and the time the second backup is requested. According to the example illustrated in FIG. 3A, the first file system extent delta tree 136:1 includes records 138:1 that indicate four file nodes 126 have been modified since performing the initial backup/creating the initial snapshot 134:1/creating the first file system extent delta tree 136:1. Specifically, the first file system extent delta tree 136:1 includes a first record 138:1 that includes: a record ID 202 of "1", a file node ID 204 of "100", and information about the changed data blocks 206 associated with the file node 126 (associated with the file node ID 204 of "100"). The first file system extent delta tree 136:1 also includes a second record 138:1 that includes: a record ID 202 of "2", a file node ID 204 of "106", and information about the changed data blocks 206 associated with the file node 126 (associated with the file node ID 204 of "106"). The first file system extent delta tree 136:1 also includes a third record 138:1 that includes: a record ID 202 of "3", a file node ID 204 of "102", and information about the changed data blocks 206 associated with the file node 126 (associated with the file node ID 204 of "102"). The first file system extent delta tree 136:1 further includes a fourth record 138:1 that includes: a record ID 202 of "4", a file node ID 204 of "128", and information about the changed data blocks 206 associated with the file node 126 (associated with the file node ID 204 of "128").

The changed data blocks 206 of each record 138:1 can be formatted in a manner that clearly describes the different data blocks of a file node 126 that have changed. For example, an entry of "{500, 550}" can indicate that data blocks "500" through "550" were modified since the last backup. Alternatively, an entry of "{500,50}" can indicate that, starting at data block "500", fifty contiguous/successive blocks were modified since the last backup. It is noted that the format of the changed data blocks 206 is not limited to the foregoing examples, and that any format/structure can be used to effectively indicate the different data blocks of the file node 126 that have changed since a prior backup. In this manner, the changed data blocks 206 of a record 138:1 can be populated with information to indicate the creation, modification, or deletion of a file node 126 within the file system volume 123.

In view of the foregoing, the file system manager 110 can be configured to analyze each of the records 138:1 to generate a backup package that includes (1) information about the file nodes 126 that have been modified (i.e., created, updated, deleted) since the last backup, and (2) information about/block data of data blocks that were affected in accordance with the modifications.

Additionally, FIG. 3B illustrates another example scenario in which the second backup is performed and a subsequent (i.e., third) backup is requested. As shown in FIG. 3B, the object map 132' enables the file system manager 110 to determine that a second snapshot 134:2 having an ID of "2" was previously created in conjunction with performing the second backup. Additionally, the file system manager 110 determines that a second file system extent delta tree 136:2 is used to track any changes that are made to the file nodes 126 of the file system volume 123 between the time the second backup is requested/performed and the time the third backup is requested.

To initialize the process for executing the third backup, the file system manager 110 generates a third snapshot 134:3 having an ID of "3", and adds the third snapshot 134:3 to the object map 132', as illustrated in FIG. 3B. As shown in FIG. 3B, the second file system extent delta tree 136:2—which, again, was established by the file system manager 110 at the time the second backup was requested/performed, and is linked to the second snapshot 134:2—includes a history of changes that have been made to the file nodes 126 between the time the second backup was requested and the time the third backup is requested.

According to the example illustrated in FIG. 3B, the second file system extent delta tree 136:2 includes records 138:2 that indicate three file nodes 126 have been modified since performing the second backup/creating the second snapshot 134:2/creating the second file system extent delta tree 136:2. Specifically, the second file system extent delta tree 136:2 includes a first record 138:2 that includes: a record ID 202 of "1", a file node ID 204 of "100", and information about the changed data blocks 206 associated with the file node 126 (associated with the file node ID 204 of "100"). The second file system extent delta tree 136:2 also includes a second record 138:2 that includes: a record ID 202 of "2", a file node ID 204 of "101", and information about the changed data blocks 206 associated with the file node 126 (associated with the file node ID 204 of "101"). The second file system extent delta tree 136:2 also includes a third record 138:2 that includes: a record ID 202 of "3", a file node ID 204 of "117", and information about the changed data blocks 206 associated with the file node 126 (associated with the file node ID 204 of "117").

Accordingly, the file system manager 110 can be configured to analyze each of the records 138:2 to generate a backup package that includes (1) information about the file nodes 126 that have been modified (i.e., created, updated, deleted) since the last backup, and (2) information about block data of data blocks that were affected in accordance with the modification. In view of the foregoing, any number of subsequent backups of the file system volume 123 can be performed using the steps as described in FIGS. 3A-3B.

Figure 4:
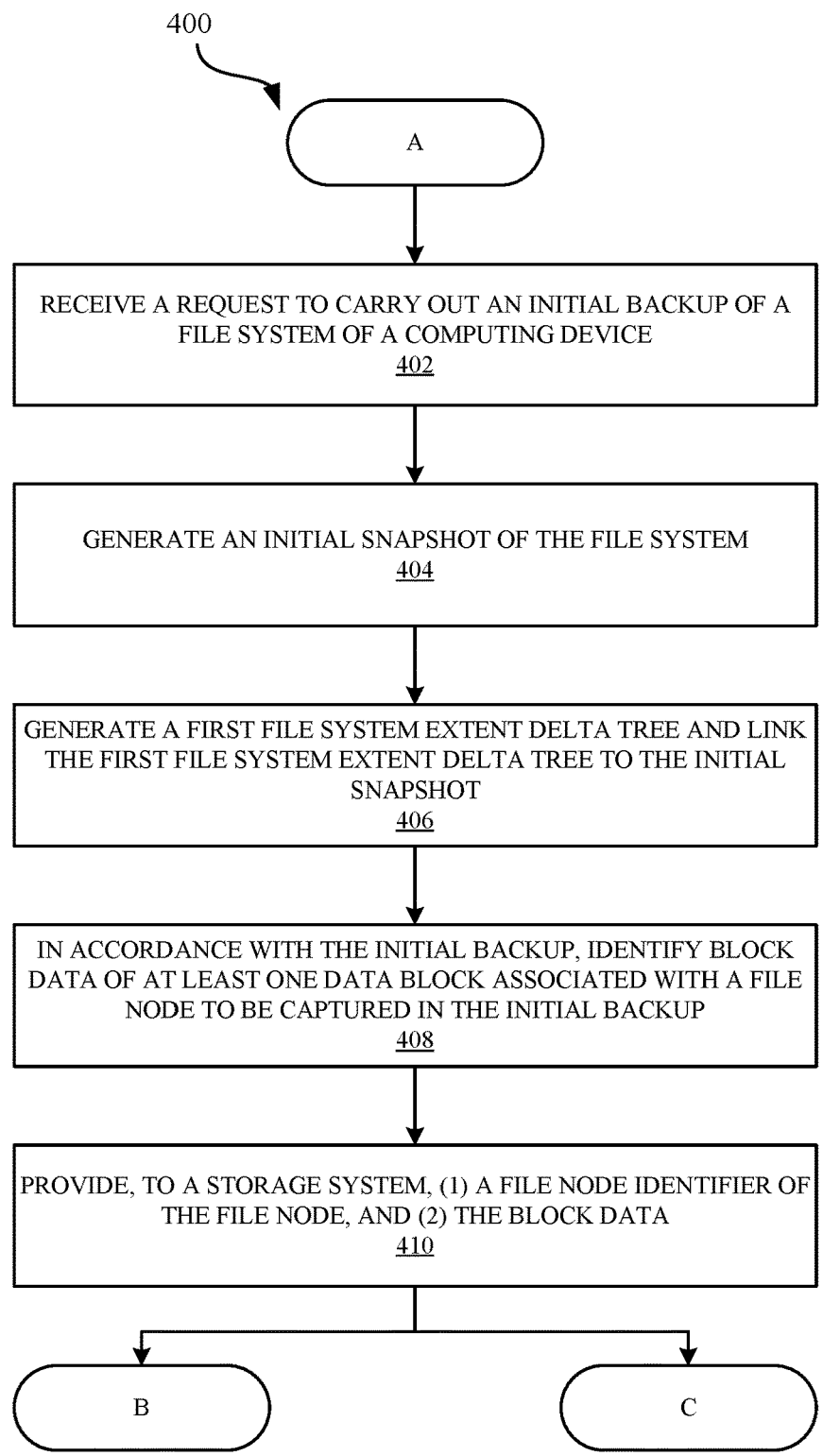
FIG. 4 illustrates a method for executing an initial backup of a file system volume at a computing device that implements the file system volume, according to some embodiments.
Figure 5:
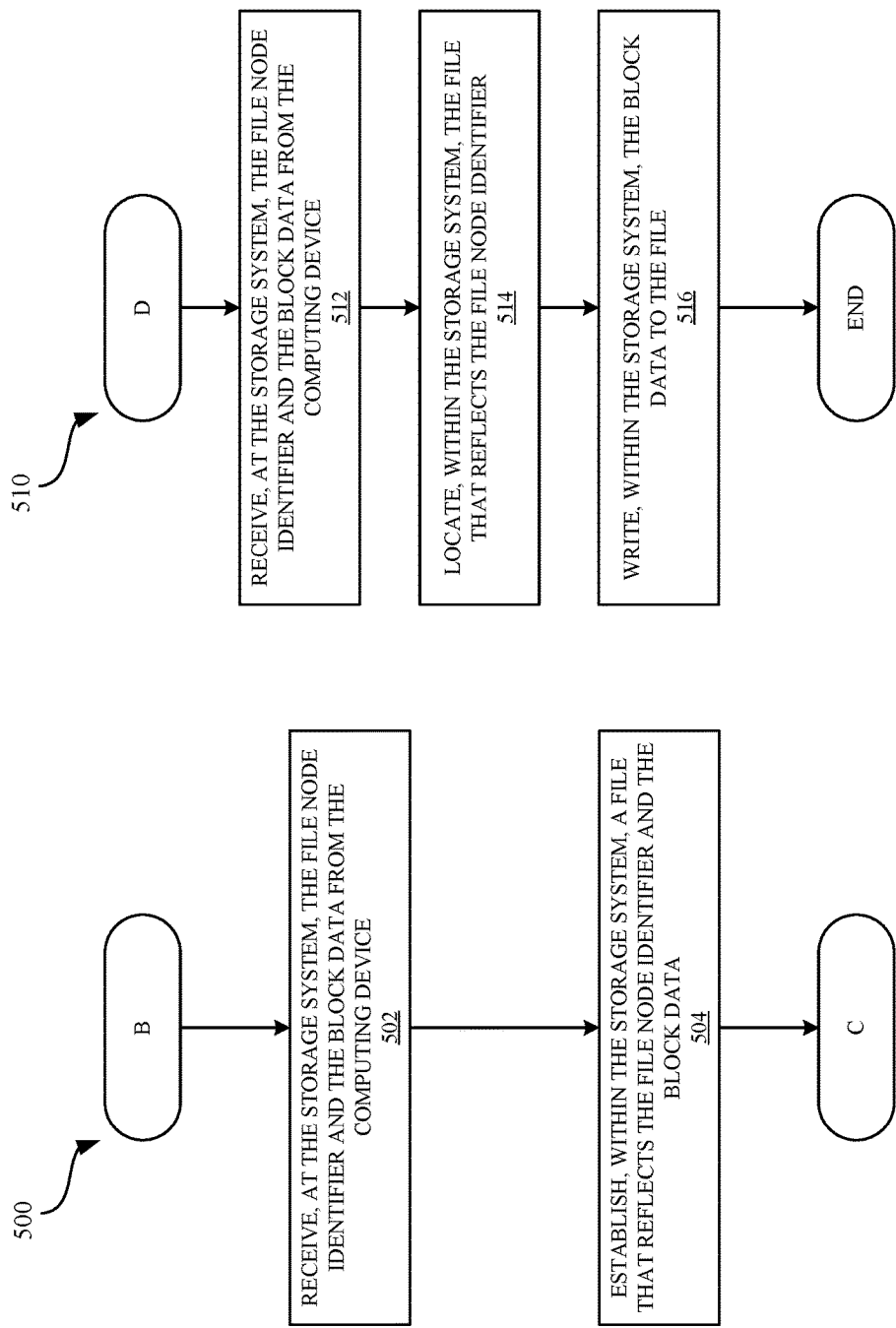
FIGS. 5A-5B illustrate a method for backing up a file system volume of a computing device at a storage system, according to some embodiments.

FIG. 4 illustrates a method 400 for executing an initial backup of a file system volume 123, according to some embodiments. As shown, the method 400 begins at step 402, where the file system manager 110 receives a request to carry out the initial backup of the file system volume 123 of the computing device 102. To initialize the process for executing the initial backup, the file system manager 110 can generate an initial snapshot 134 at step 404. In turn, the file system manager 110 can add the initial snapshot 134 to the object map 132, e.g., as previously described above in conjunction with FIGS. 3A-3B.

At step 406, the file system manager 110 generates a first file system extent delta tree 136 and links the first file system extent delta tree 136 to the initial snapshot 134 in conjunction with the creation of the initial snapshot 134. As previously described herein, the first file system extent delta tree 136 can be used to track any changes made to the file nodes 126 of the file system volume 123 after the initial backup is requested/performed. As a reminder, the first file system extent delta tree 136 includes records 138 that can include a key/value pair that associates the records 138 with (1) a record ID 202 (that uniquely identifies each record 138 within the first file system extent delta tree 136), (2) a file node ID 204 (that corresponds to a file node 126 in the file system root tree 124), and (3) changed data blocks 206 (that refers to modified data blocks associated with the file node 126).

At step 408, in accordance with carrying out the initial backup, the file system manager 110 can identify block data of at least one data block associated with a file node 126 to be captured in the initial backup. Of course, additional data blocks of additional file nodes 126 can be captured in the initial backup in accordance with configuration parameters under which the file manager 110 operates.

At step 410, the file system manager 110 provides, to the storage system 150, the (1) file node ID 204 that corresponds to the file node 126, and (2) the block data of the file node 126. In turn, the method 400 can proceed to step 502 of FIG. 5A, which describes actions that are taken by the storage system 150 in response to receiving the information tied to the initial backup, which is described below in greater detail in conjunction with FIG. 5A. Alternatively, the method 400 can proceed to step 602 of FIG. 6, which describes actions that are taken by the file system manager 110 in response to receiving a request to carry out a second backup of the file system volume 123 of the computing device 102.

FIG. 5A illustrates a method 500 that extends the method 400 described above in conjunction with FIG. 4. In particular, the method 500 involves carrying out the initial backup of the file system volume 123 at the storage system 150. As shown, the method 500 begins at step 502, where the storage system 150 receives the (1) file node ID 204 that corresponds to the file node 126, and (2) the block data of the file node 126, from the file system manager 110 executing on the computing device 102. At step 504, the storage system 150 establishes a file within the storage system 150 that reflects the (1) file node ID 204, and (2) the block data of the file node 126.

According to some embodiments, the storage system 150 can be configured to store backups of the file system volume 123 in sandboxed storage areas that are specifically linked to the computing device 102 and/or a user account that is associated with the computing device 102 and other computing devices 102. In this manner, when the storage system 150 receives backup packages from the computing device 102, the storage system 150 can uniquely identify the computing device 102/user account, identify the appropriate sandboxed storage area(s), and properly reflect the backup packages within the sandboxed storage area(s). In this manner, the same file node IDs 204 can be utilized at the storage system 150 without having to implement a translation table that links file node IDs 204 at the computing device 102 to file node IDs 204 at the storage system 150, which can substantially reduce the level of resources that are required to carry out backups at the storage system 150.

According to some embodiments, a sandboxed storage area can be established by forming one or more logical wrappers around the different backups of the file system volume 123. For example, various backups of the file system volume 123 can be stored within a single logical wrapper associated with the computing device 102/user account. In another example, each backup of the file system volume 123 can be stored within a respective logical wrapper associated with the computing device 102/user account. In either approach, the logical wrapper can be protected such that information associated with the computing device 102/user account is required in order to access/modify the different backups of the file system volume 123, thereby increasing security. For example, credentials associated with the user account, e.g., a username and a password, can be required to properly access/modify the different backups of the file system volume 123 at the storage system 150. Alternatively, or moreover, credentials associated with the computing device 102 can be required, e.g., hardware identifiers, tokens, etc., can be required to properly access/modify the different backups of the file system volume 123 at the storage system 150. In this manner, unauthorized attempts to access/modify backups of file system volumes 123 within the storage system 150—e.g., by way of malicious software executing outside of or within the storage system 150—can be thwarted, thereby substantially enhancing overall security.

Figure 6:
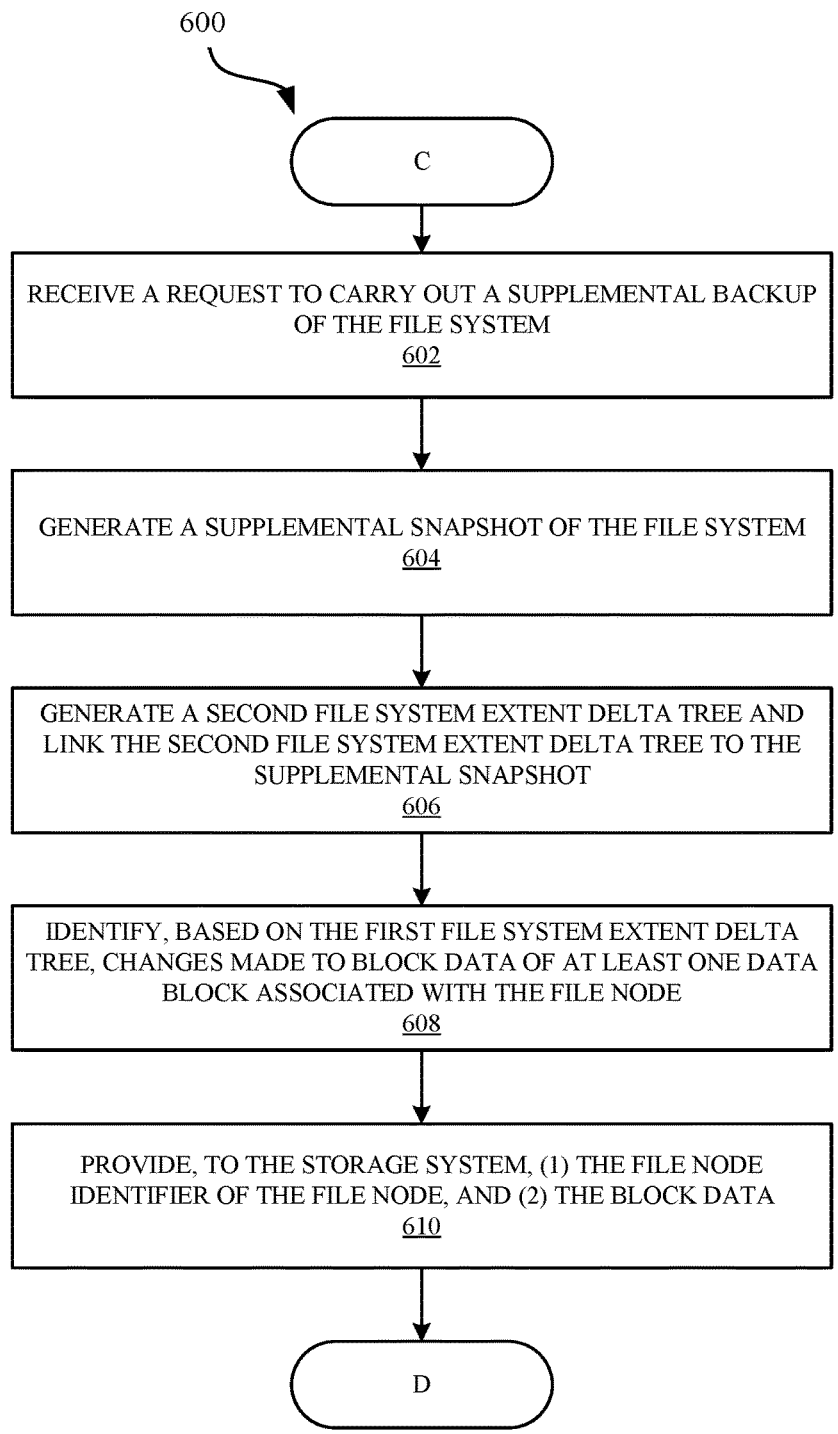
FIG. 6 illustrates a method for executing a supplemental backup of a file system volume, according to some embodiments.

FIG. 6 illustrates a method 600 that extends the method 400 described above in conjunction with FIG. 4. In particular, the method 600 involves executing a supplemental (i.e., second) backup of the file system volume 123. As shown in FIG. 6, at step 602, the file system manager 110 receives a request to carry out a supplemental backup of the file system volume 123. To initialize the process for executing the supplemental backup, at step 604, the file system manager 110 can generate a supplemental snapshot 134. In turn, the file system manager 110 can add the supplemental snapshot 134 to the object map 132, e.g., as previously described above in conjunction with FIGS. 3A-3B.

At step 606, and in conjunction with step 604, the file system manager 110 can generate a second file system extent delta tree 136 and link the second file system extent delta tree 136 to the supplemental snapshot 134. At this point, the first file system extent delta tree 136 includes a history of changes that have been made to the file nodes 126 since the first snapshot 134. In particular, the first file system extent delta tree 136 includes records 138 that indicate the file nodes 126 that have been modified since the time the initial backup is performed (at steps 402-410) and the time the supplemental backup is requested (at step 602).

At step 608, the file system manager 110 can analyze the records 138 stored in the first file system extent delta tree 136 to identify specific changes made to at least one data block associated with a file node 126 to be reflected when carrying out the supplemental backup. At step 610, the file system manager 110 provides, to the storage system 150, the (1) file node ID 204 that corresponds to the file node 126, and (2) the block data of the at least one changed data block of the file node 126. In turn, the method 600 can proceed to step 512, which is described below in detail in conjunction with FIG. 5B.

FIG. 5B illustrates a method 510 that extends the method 600, according to some embodiments. In particular, the method 510 involves executing the supplemental backup of the file system volume 123 at the storage system 150. As shown in FIG. 5B, the method 510 begins at step 512, where the storage system 150 receives the (1) file node ID 204 that corresponds to the file node 126, and (2) the block data of the at least one changed data block of the file node 126, gathered at steps 608-610 of FIG. 6. At step 514, the storage system 150 can utilize the file node ID 204 to locate a corresponding file within the storage system 150. In turn, at step 516, the storage system 150 can update the corresponding file by writing the block data of the at least one changed data block of the file node 126 to the corresponding file.

Figure 7:
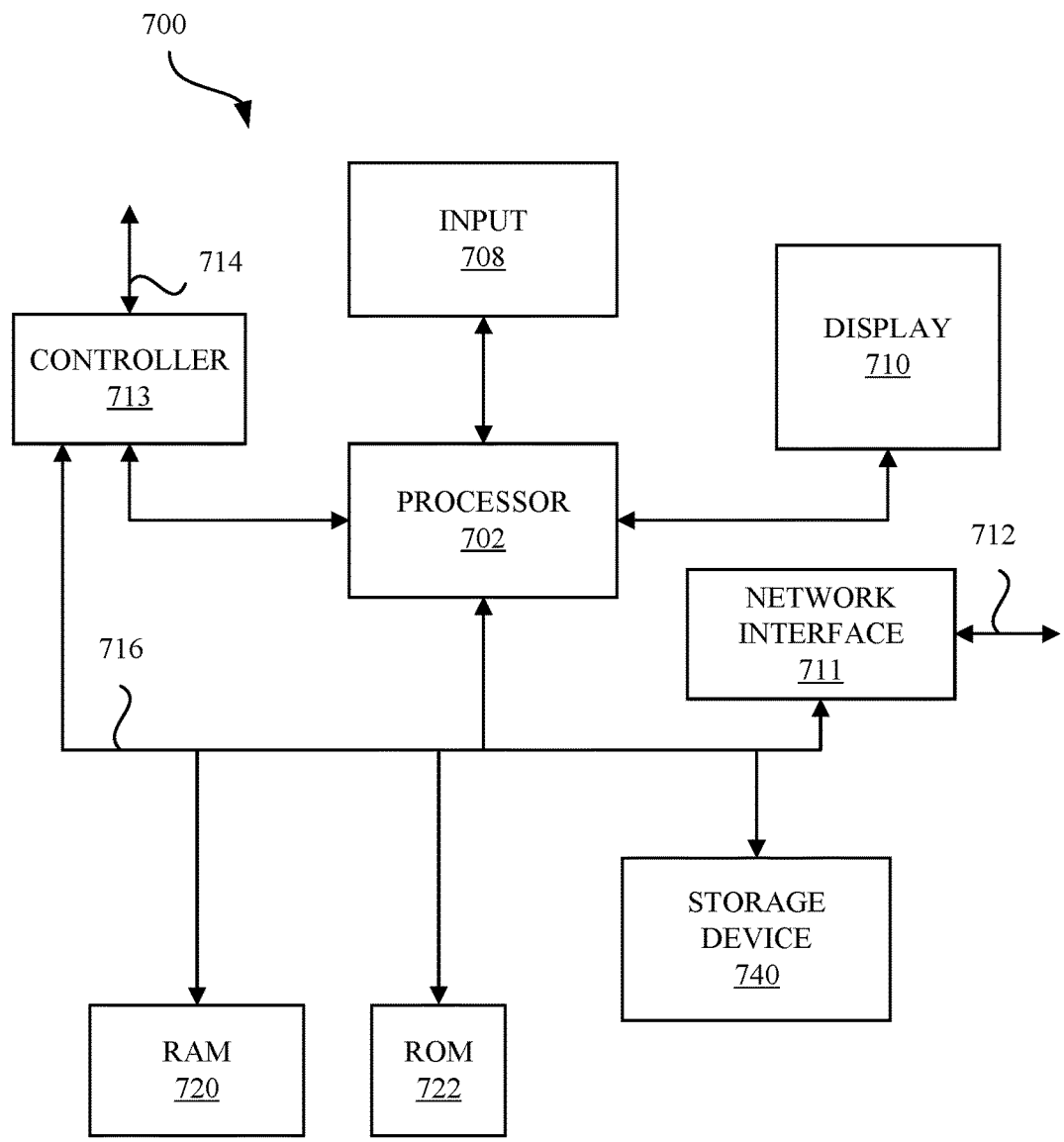
FIG. 7 is a block diagram of a computing device that can represent the components of a computing device or any other suitable device or component for realizing any of the methods, systems, apparatus, and embodiments described herein.

FIG. 7 illustrates a detailed view of a computing device 700 that can be used to implement the various techniques described herein, according to some embodiments. In particular, the detailed view illustrates various components that can be included in the computing device 102 or the storage system 150 illustrated in FIG. 1. As shown in FIG. 7, the computing device 700 can include a processor 702 that represents a microprocessor or controller 713 for controlling the overall operation of computing device 700. The computing device 700 can also include a user input device 708 that allows a user of the computing device 700 to interact with the computing device 700. Still further, the computing device 700 can include a display 710 (screen display) that can be controlled by the processor 702 to display information to the user. A data bus 716 can facilitate data transfer between the storage device 740, the processor 702, and the controller 713. The controller 713 can be used to interface with and control different equipment through an equipment control bus 714. The computing device 700 can also include a network/bus interface 711 that couples to a data link 712. In the case of a wireless connection, the network/bus interface 711 can include a wireless transceiver.

The computing device 700 also include a storage device 740, which can comprise a single disk or multiple disks (e.g., hard drives), and includes a storage management module that manages one or more partitions within the storage device 740. In some embodiments, the storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for backing up data managed at a computing device, the method comprising, in response to a request to carry out a backup of the data:
   generating a current snapshot of the data by:
      generating a unique identifier for the current snapshot, inserting the unique identifier into an object map that stores unique identifiers for snapshots, and
      generating an extent delta tree for the current snapshot, wherein the extent delta tree is associated with the unique identifier, and the extent delta tree stores information about block-level changes that occur to the data subsequent to generating the current snapshot;
   identifying block data of at least one data block to be reflected in the backup of the data, wherein the at least one data block is tagged with an identifier of a file node to which the at least one data block corresponds; and
   providing information to a storage system to cause the block data to be reflected in the backup of the data.

2. The method of claim 1, wherein the current snapshot of the data represents an initial snapshot of the data, and reflecting the block data in the backup of the data comprises:
   (1) writing the block data to the storage system, and
   (2) establishing, within the storage system, a file that references the block data, wherein the file corresponds to the file node at the computing device.

3. The method of claim 1, wherein the current snapshot of the data represents a supplemental snapshot of the data, the at least one data block is identified using a first extent delta tree that precedes the extent delta tree, and the file node corresponds to an existing file stored in the storage system.

4. The method of claim 3, wherein changes to the data blocks occurred between (1) a first time at which a previous snapshot of the data was taken, and (2) a second time at which the current snapshot of the data was taken.

5. The method of claim 4, wherein a previous extent delta tree is associated with the previous snapshot of the data, and identifying the changes comprises analyzing records within the previous extent delta tree that indicate the changes.

6. The method of claim 3, wherein the block data corresponds to a new portion of the existing file, and the information includes (1) the block data, and (2) a first identifier that enables the existing file to be located within the storage system.

7. The method of claim 3, wherein the block data corresponds to an updated portion of the existing file, and the information includes (1) the block data, (2) a first identifier that enables the existing file to be located within the storage system, and (3) second information that enables the updated portion of the existing file to be identified within the storage system.

8. The method of claim 3, wherein the block data corresponds to a deleted portion of the existing file, and the information includes (1) a first identifier that identifies the existing file, and (2) second information that enables the deleted portion of the existing file to be located within the storage system.

9. The method of claim 3, wherein:
   the step of identifying further comprises identifying, based on the at least one data block and/or one or more other data blocks, that the file node is deleted, and
   the step of providing the information causes the storage system to delete the existing file.

10. The method of claim 1, wherein the storage system is a cloud storage system and/or a local storage system.

11. At least one non-transitory computer readable storage medium configured to store instructions that, when executed by at least one processor included in a computing device, cause the computing device to carry out backups of a file system volume managed at the computing device, by carrying out steps that include:
   in response to a first request to carry out an initial backup of the file system volume, generating (1) a first snapshot of the file system volume, and (2) a first file system extent delta tree associated with the first snapshot, wherein the first snapshot and the first file system extent delta tree are each associated with a same first unique identifier;
   providing, to a storage system, data of at least one file node included in the file system volume to cause a copy of the at least one file node to be established in the storage system;
   in response to a second request to carry out a second backup of the file system volume, generating (1) a second snapshot of the file system volume, and (2) a second file system extent delta tree associated with the second snapshot, wherein the second snapshot and the second file system extent delta tree are associated with a same second unique identifier that is distinct from the first unique identifier;

identifying, in accordance with first file system extent delta tree, block data of at least one data block associated with the at least one file node that has changed since the initial backup, wherein the at least one data block is tagged with an identifier of the at least one file node; and providing a backup package to the storage system to cause the block data to be reflected in the second backup of the file system volume.

12. The at least one non-transitory computer readable storage medium of claim 11, wherein the first file system extent delta tree includes records of changes to file nodes between the initial backup of the file system volume and the second backup of the file system volume, and the second file system extent delta tree includes records of changes to file nodes between the second backup of the file system volume and a subsequent backup of the file system volume.

13. The at least one non-transitory computer readable storage medium of claim 11, wherein the block data corresponds to a new portion of the at least one file node, and the backup package includes (1) the block data, and (2) a first identifier that enables the copy of the at least one file node to be located within the storage system.

14. The at least one non-transitory computer readable storage medium of claim 11, wherein the block data corresponds to an updated portion of the at least one file node, and the backup package includes (1) the block data, (2) a first identifier that enables the copy of the at least one file node to be located within the storage system, and (3) second information that enables the updated portion of the copy of the at least one file node to be identified within the storage system.

15. The at least one non-transitory computer readable storage medium of claim 11, wherein the block data corresponds to a deleted portion of the at least one file node, and the backup package includes (1) a first identifier that identifies the copy of the at least one file node, and (2) second information that enables the deleted portion of the copy of the at least one file node to be located within the storage system.

16. A computing device configured to back up data managed by the computing device, the computing device comprising:

at least one memory; and at least one processor communicatively coupled to the at least one memory, the at least one processor configured to, in response to a request to carry out a backup of the data:

generate a current snapshot of data by:
generating a unique identifier for the current snapshot,
inserting the unique identifier into an object map that stores unique identifiers for snapshots, and
generating an extent delta tree for the current snapshot, wherein the extent delta tree is associated with the unique identifier, and the extent delta tree stores information about block-level changes that occur to the data subsequent to generating the current snapshot;

identify block data of at least one data block to be reflected in the backup of the data, wherein the at least one data block is tagged with an identifier of a file node to which the at least one data block corresponds; and provide information to a storage system to cause the block data to be reflected in the backup of the data.

17. The computing device of claim 16, wherein:
the current snapshot of the data represents a supplemental snapshot of the data,
the at least one data block is identified by analyzing a first extent delta tree that precedes the extent delta tree, and
the file node corresponds to an existing counterpart file node stored in the storage system.

18. The computing device of claim 17, wherein the block data corresponds to a new portion of the existing counterpart file node, and the information includes (1) the block data, and (2) a first identifier that enables the existing counterpart file node to be located within the storage system.

19. The computing device of claim 17, wherein the block data corresponds to an updated portion of the existing counterpart file node, and the information includes (1) the block data, (2) a first identifier that enables the existing counterpart file node to be located within the storage system, and (3) second information that enables the updated portion of the existing counterpart file node to be identified within the storage system.

20. The computing device of claim 17, wherein the block data corresponds to a deleted portion of the existing counterpart file node, and the information includes (1) a first identifier that identifies the existing counterpart file node, and (2) second information that enables the deleted portion of the existing counterpart file node to be located within the storage system.

* * * * *